United States Patent
Jaspaert

(10) Patent No.: US 10,066,765 B2
(45) Date of Patent: *Sep. 4, 2018

(54) FLEXIBLE PIPE AND COUPLING THEREFOR

(71) Applicant: MANTARAY INNOVATIONS LIMITED, Bellingham (GB)

(72) Inventor: Bruno Jaspaert, Newcastle upon Tyne (GB)

(73) Assignee: MANTARAY INNOVATIONS LIMITED, Bellingham (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/718,892

(22) Filed: May 21, 2015

(65) Prior Publication Data
US 2015/0252929 A1    Sep. 10, 2015

Related U.S. Application Data

(63) Continuation of application No. 14/646,553, filed as application No. PCT/GB2013/053089 on Nov. 22, 2013.

(30) Foreign Application Priority Data

Nov. 22, 2012    (GB) ................................... 1221034.0

(51) Int. Cl.
*F16L 11/00*    (2006.01)
*F16L 53/30*    (2018.01)
(Continued)

(52) U.S. Cl.
CPC .......... *F16L 11/00* (2013.01); *B29C 65/3612* (2013.01); *B29C 65/3616* (2013.01);
(Continued)

(58) Field of Classification Search
CPC ....... F16L 25/0081; F16L 33/01; F16L 33/34; B29C 66/73941; B29C 66/7392;
(Continued)

(56) References Cited

U.S. PATENT DOCUMENTS 2,506,494 A * 5/1950 Feiler .................... F16L 33/003
                                                                285/222.2
2,940,778 A * 6/1960 Kaiser .................... F16L 33/01
                                                                285/222.2
(Continued)

FOREIGN PATENT DOCUMENTS

CN        202149293 U      2/2012
DE           2719320 B1    12/1978
(Continued)

OTHER PUBLICATIONS

U.S. Appl. No. 14/646,553, filed May 21, 2015, Jaspaert.
(Continued)

*Primary Examiner* — David Bochna
(74) *Attorney, Agent, or Firm* — Winstead PC

(57) ABSTRACT

Embodiments of the invention relate to the construction of a sealed connection between an elastomeric or synthetic polymer flexible pipe or hose and a metallic coupling member. The coupling member surrounds an armor layer at a free end of the flexible pipe or hose. A sealing area is defined by a recessed portion of the pipe coupling into which a sealing material is introduced. An inner layer of the flexible pipe or hose may extend into the sealing area where it is bonded to the sealing material. The sealing material and the inner liner layer may each be comprised of a semi-crystalline thermoplastic material. Furthermore, a reinforcement material is provided in the inner layer.

26 Claims, 13 Drawing Sheets

(51) Int. Cl.
    B29C 65/42     (2006.01)
    B29C 65/54     (2006.01)
    B32B 1/08      (2006.01)
    F16L 33/01     (2006.01)
    F16L 33/34     (2006.01)
    F16L 47/24     (2006.01)
    B29C 65/36     (2006.01)
    B29C 65/48     (2006.01)
    B29C 65/00     (2006.01)
    F16L 47/02     (2006.01)
    B32B 15/14     (2006.01)
    B32B 15/18     (2006.01)
    B32B 25/10     (2006.01)
    B32B 27/12     (2006.01)
    B32B 27/32     (2006.01)
    F16L 11/20     (2006.01)
    F16L 13/007    (2006.01)
    F16L 13/02     (2006.01)
    F16L 33/32     (2006.01)
    F16L 39/02     (2006.01)
    F16L 53/00     (2018.01)
    B29L 23/00     (2006.01)

(52) U.S. Cl.
    CPC .......... B29C 65/42 (2013.01); B29C 65/425
         (2013.01); B29C 65/4815 (2013.01); B29C
         65/4835 (2013.01); B29C 65/54 (2013.01);
         B29C 65/542 (2013.01); B29C 66/12822
         (2013.01); B29C 66/12842 (2013.01); B29C
         66/5344 (2013.01); B29C 66/612 (2013.01);
         B29C 66/632 (2013.01); B29C 66/634
         (2013.01); B29C 66/721 (2013.01); B29C
         66/72141 (2013.01); B29C 66/72341
         (2013.01); B29C 66/72343 (2013.01); B29C
         66/7392 (2013.01); B29C 66/7394 (2013.01);
         B29C 66/73774 (2013.01); B29C 66/73921
         (2013.01); B29C 66/73941 (2013.01); B29C
         66/742 (2013.01); B29C 66/8266 (2013.01);
         B32B 1/08 (2013.01); B32B 15/14 (2013.01);
         B32B 15/18 (2013.01); B32B 25/10 (2013.01);
         B32B 27/12 (2013.01); B32B 27/32 (2013.01);
         F16L 11/20 (2013.01); F16L 13/007
         (2013.01); F16L 13/02 (2013.01); F16L 33/01
         (2013.01); F16L 33/32 (2013.01); F16L 33/34
         (2013.01); F16L 39/02 (2013.01); F16L 47/02
         (2013.01); F16L 47/24 (2013.01); F16L
         53/001 (2013.01); F16L 53/30 (2018.01);
         B29C 66/71 (2013.01); B29C 66/7212
         (2013.01); B29C 66/72321 (2013.01); B29C
         66/73755 (2013.01); B29L 2023/005
         (2013.01); B32B 2262/0253 (2013.01); B32B
         2262/0269 (2013.01); B32B 2262/101
         (2013.01); Y10T 156/10 (2015.01)

(58) Field of Classification Search
    CPC ... B29C 66/72341; B32B 27/32; B32B 27/12;
                                 B32B 15/18; B32B 15/14

USPC ................... 285/222.2, 290.3, 294.3
    See application file for complete search history.

(56)            References Cited

U.S. PATENT DOCUMENTS 3,886,980  A       6/1975  Elson
    4,353,581  A  *   10/1982  Eisenzimmer ......... F16L 33/34
                                                        285/222.4
    4,372,562  A  *    2/1983  Carter, Jr. .......... E21B 33/1277
                                                        285/294.3
    4,605,466  A  *    8/1986  Eisenzimmer ......... F16L 33/34
                                                        285/238
    4,666,191  A  *    5/1987  Sotelo ..................... F16L 33/01
                                                        285/222.2
    5,829,795  A       11/1998  Riesselmann
    6,315,002  B1      11/2001  Antal et al.
    6,513,552  B1       2/2003  Shepherd
    6,742,813  B1 *     6/2004  Glejbol ................. F16L 33/003
                                                        285/222.2
    6,938,932  B2 *     9/2005  Grepaly ................. F16L 33/01
                                                        285/222.2
    2002/0189698  A1   12/2002  Grepaly et al.
    2003/0192641  A1   10/2003  Espejo
    2004/0175464  A1    9/2004  Blemberg et al.
    2005/0170118  A1    8/2005  Cleveland et al.
    2015/0252929  A1*   9/2015  Jaspaert .................... B32B 1/08
                                                        285/41

FOREIGN PATENT DOCUMENTS

EP          2172324  A1    4/2010
    GB          1409096  A    10/1975
    GB          1441573  A     7/1976
    GB          2329439  B     7/2002
    GB          2453845  A     4/2009
    JP       H03504632  A    10/1991
    JP        H0554888       * 7/1993  ............. F16L 33/01
    JP       H09164598  A     6/1997
    JP        2001279207  A   10/2001
    JP        2009204144  A    9/2009
    WO        WO-9725564  A1   7/1997
    WO        WO-0113022  A1   2/2001
    WO     WO-2008028224  A1   3/2008
    WO     WO-2010083942  A1   7/2010
    WO     WO-2011053141  A1   5/2011
    WO     WO-2012092931  A1   7/2012

OTHER PUBLICATIONS

American Petroleum Institute, "Drilling and Well Servicing Equipment," API Specification 7K, Fifth Edition, Jun. 2010, 91 pages.
Campion, R.P., et al.; "Elastomers for Fluid Containment in Offshore Oil and Gas Production: Guidelines and Review"; Health & Safety Executive Research Report 320; Jan. 1, 2005; 111 pages.
American Petroleum Institute; "API Specification 16C: Choke and Kill Systems: Sections 10.2 and 3: Purchasing Guidelines and Design Requirements"; American Petroleum Institute Purchasing Guidelines Handbook, 1st Edition; Jan. 1993; 5 pages.
ASTM International; "Standard Test Method for Adhesion Between Steel Tire Cords and Rubber"; Jan. 1, 2004; 7 pages.
Fromentel, Henri, "International Search Report," prepared for PCT/GB2013/053089, dated Mar. 19, 2014, nine pages.

* cited by examiner

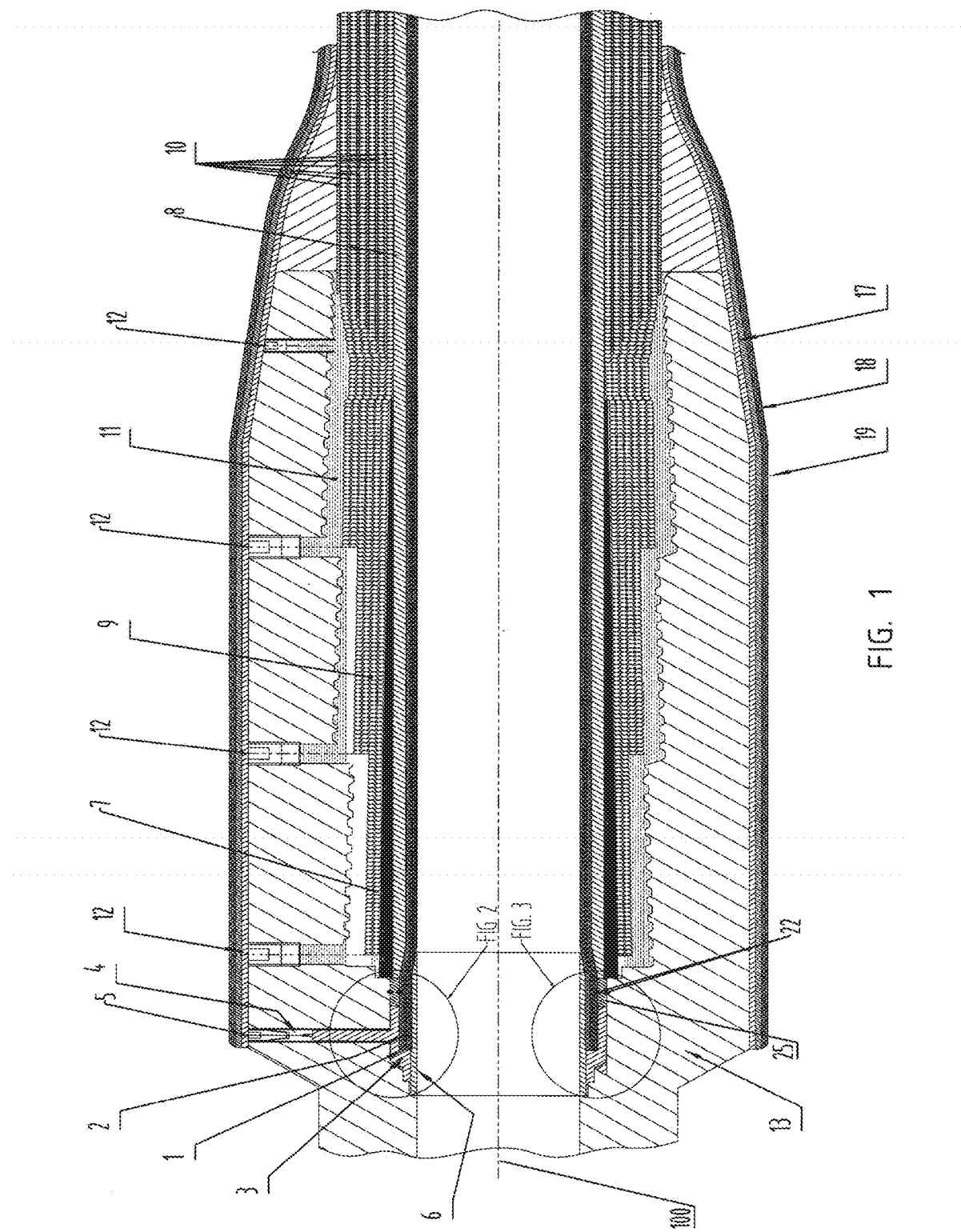

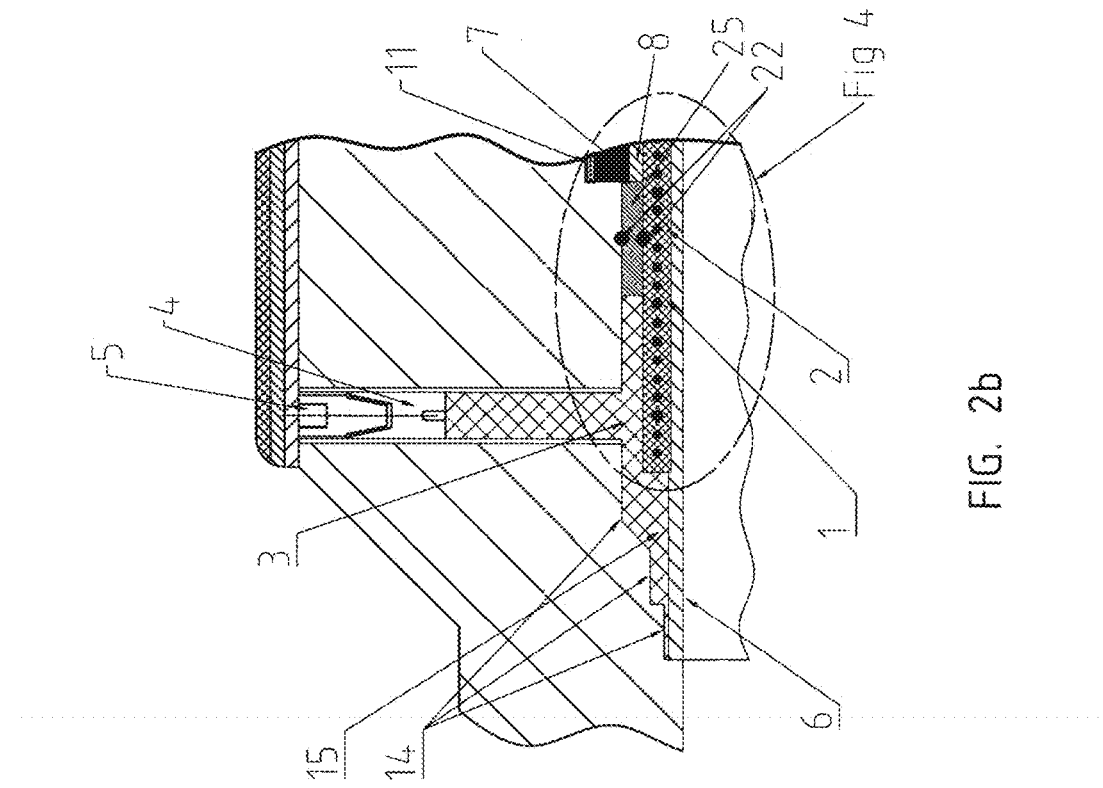
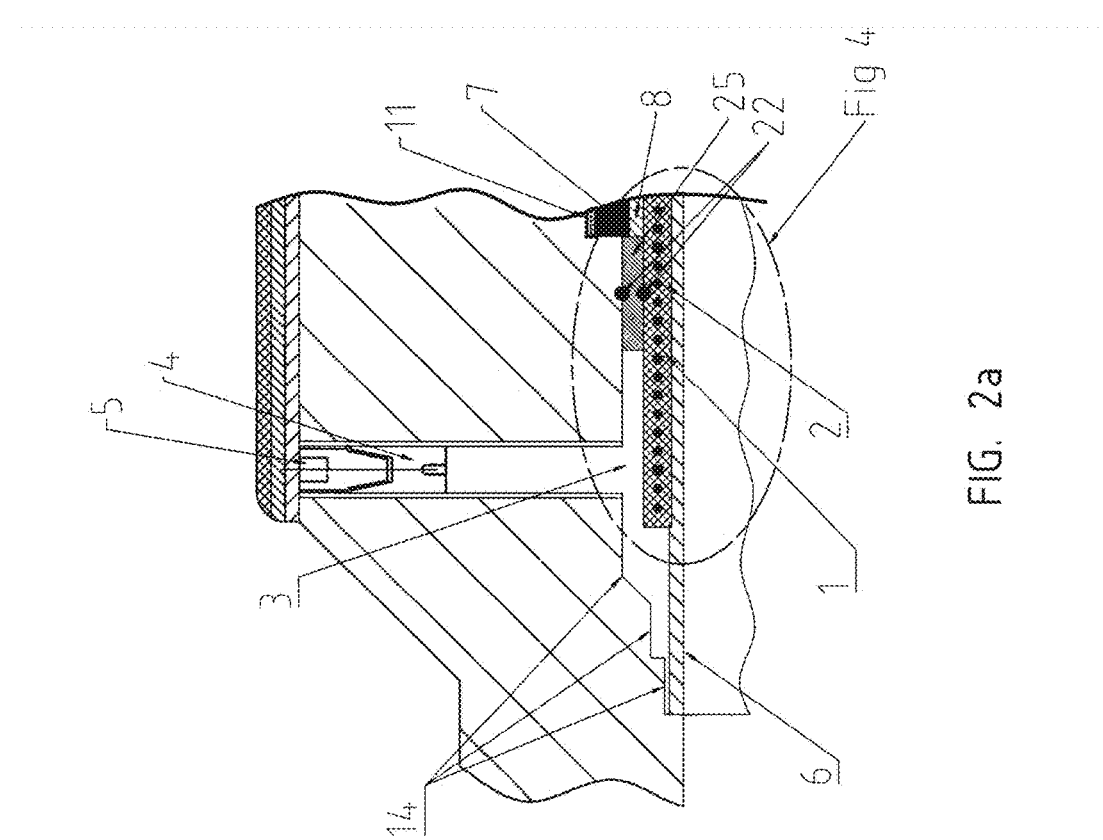

$\beta < 25°$ $25° \geq \alpha \leq 85°$

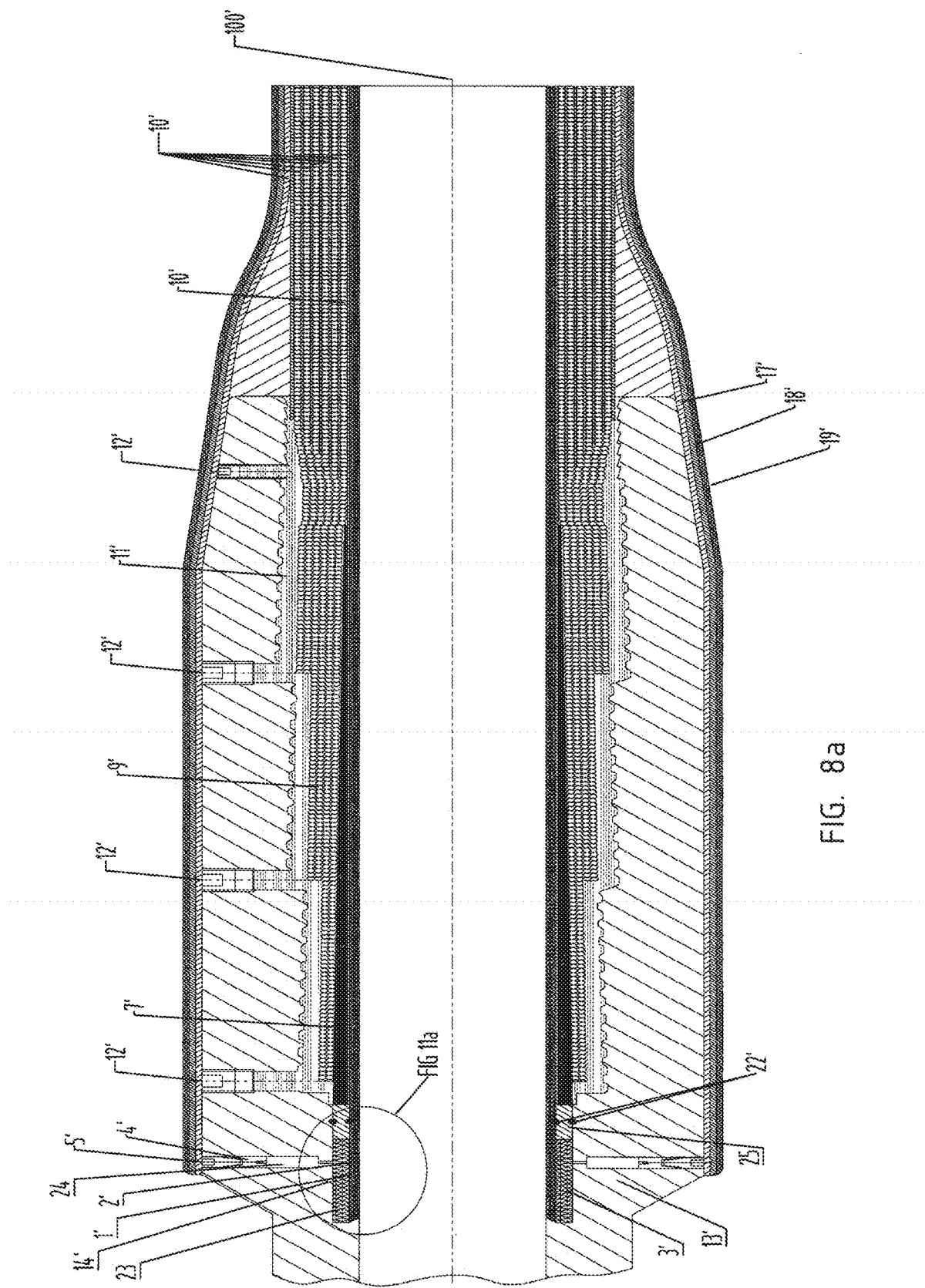

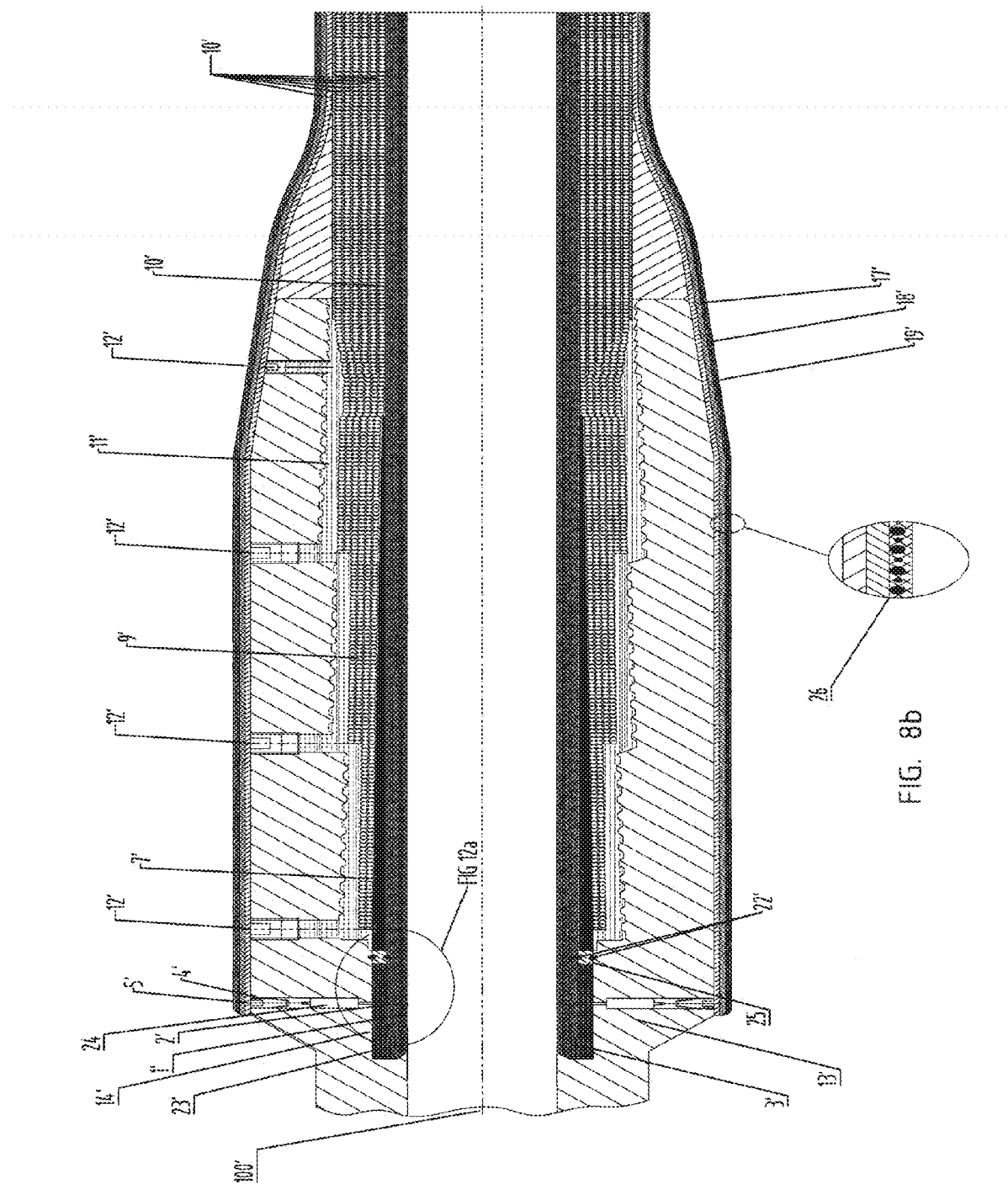

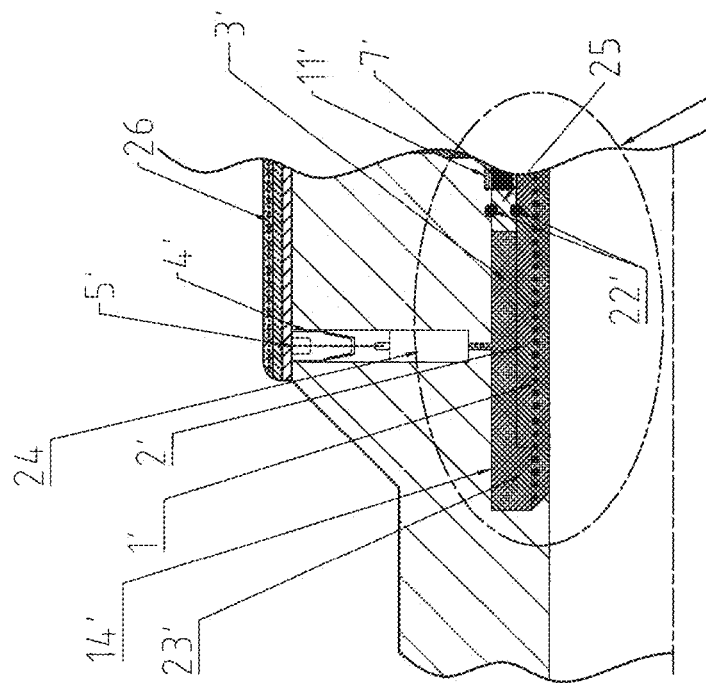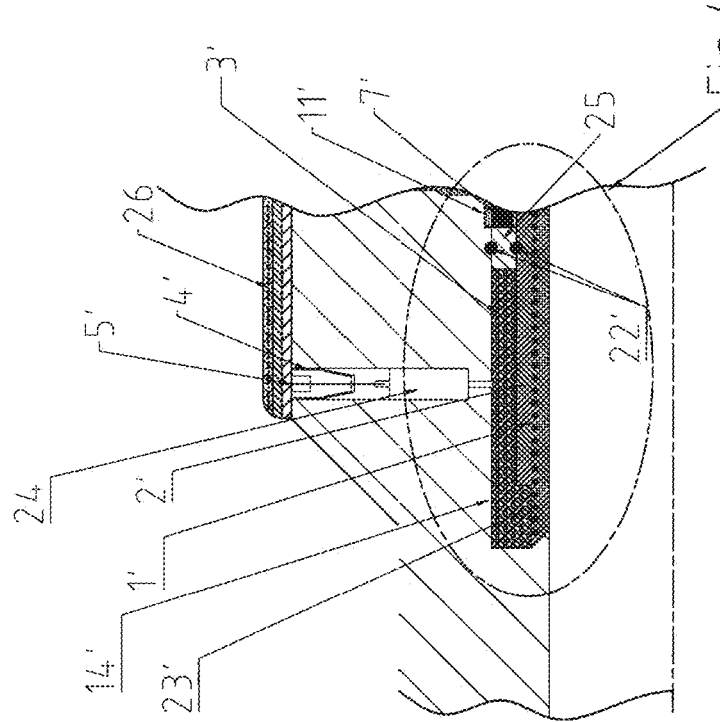

FLEXIBLE PIPE AND COUPLING THEREFOR

TECHNICAL FIELD

The present invention relates to a flexible pipe or hose for high pressure or high pressure/high temperature applications and particularly, though not exclusively, to the construction of a sealed connection between the pipe or hose and a metallic coupling member. In one embodiment of the invention, a reinforcement means is incorporated into an inner liner of the flexible pipe or hose. The flexible pipe or hose of the present invention is primarily intended to be suitable for the transportation of hydrocarbon liquids or gases and/or water. Also disclosed are methods for manufacturing a flexible pipe or hose having the aforementioned characteristics. Whilst the terms "pipe" and "hose" are generally used synonymously throughout the present disclosure, a pipe may be understood as being relatively less flexible than a hose where the context so allows.

BACKGROUND

Flexible pipes or hoses are used in both onshore and offshore applications in the field of oil & gas exploration primarily for the transportation of fluids and gases. The term "flexible" is to be understood to exclude substantially rigid constructions, such as steel pipes. Flexible pipes or hoses are typically used to transport pressurised, high temperature crude oil and gas from a seabed based wellhead to a floating platform or processing facility. However, they are equally suitable for carrying a wide range of injection or service fluids aimed at enhancing or maintaining production output. Consequently, flexible pipes hoses are exposed to wide variations in both internal & external pressure and temperature.

Typical pipe or hose pressure and temperature ratings are disclosed in, e.g., American Petroleum Institute (API) standard 7K—5$^{th}$ Edition—June 2010, tiled 'Drilling and Well Servicing Equipment' (see paragraphs 9.6.1, 9.6.3.1 and Table 9). Further guidance on the pressure and/or temperature conditions experienced in flexible pipes or hoses (typically of diameter of 3" and above) can be found in API standards, 16C (see Tables 3.4.1, 3.4.2, 3.4.3 and 3.5.2.1), OCIMF, 17J and 17K. In moderate diameter hoses the pressure rating will typically be several hundred bar (e.g. of the order of 10 to over 100 MPa.), and will decrease with increasing hose diameter. Flexible pipes or hoses must be able to withstand typical temperature conditions of approximately −40° C. to +132° C. depending upon the application.

Flexible pipes can be divided into two categories: bonded and unbonded. Unbonded flexible pipes typically comprise a number of metallic armour layers and polymeric anti-wear/anti-friction layers whereby a degree of relative slippage between at least two adjacent layers is possible. Even where one layer is embedded within another, the non-bonded characteristics can be demonstrated by a simple pull out test of, for example, a steel cord reinforcement layer out of its surrounding polymer matrix. This test is based on an adapted version of the 'Standard Test Method for Rubber Property—Adhesion to Steel Cord' (ASTMD 2229-85)'.

Bonded pipes—which are commonly used for a range of similar applications as non-bonded pipes—preclude any slippage between adjacent layers. Bonded pipes employ either an inner elastomeric or thermoplastic liner pipe that is sometimes extruded on or bonded to an underlying metal carcass and surrounded by an armour layer. The entire pipe can be considered to be a composite of bonded metal cable or wire (either brass-coated or galvanised) and elastomeric layers, with the possible inclusion of a thermoplastic inner liner layer as noted below. Bonded pipes are tested to ensure that they are capable of withstanding rapid gas decompression events which can cause a blistering phenomenon in their innermost layers. Bonded flexible pipe types can be used as flexible risers, loading hoses or hoses for exploration (rotary hoses, choke & kill hoses, mud & cement hoses).

In order to avoid liquid and gas permeation losses, a thermoplastic pipe—or a pipe having a thermoplastic inner liner—is often employed so as to enhance its overall sealing ability. However, some fluids or gases can be very aggressive and cause rapid degradation of certain polymers or plastics liners, especially at higher temperatures. To address this problem, it is known to employ more chemically inert polymer types within the pipe and/or its inner liner (if present) such as cross-linked polyethylene (PEX), polyamide 11/12 (PA11/PA12), ethylene tetrafluoroethylene (ETFE), polyvinylidene fluoride (PVDF) or polyether ether ketone (PEEK). Whilst these engineered polymers offer many advantages in terms of temperature resistance, sour corrosion resistance, anti-cracking behaviour, low gas/liquid permeability etc., they are known to be less effective in ensuring a good quality seal with a hose coupling (i.e. either a pipe-to-pipe or pipe-to-end-fitting connection). Often these liners are reinforced with an inner (stainless steel) carcass.

To ensure a reliable seal between a pipe, or an inner liner thereof, and a coupling (i.e. either a pipe-to-pipe or pipe-to-end-fitting connection) all 'leakage paths' must be eliminated. A leakage path is any path allowing pressurized fluid or gas to equalise with a lower pressure state. Fabrics, air pockets, armouring cables or any continuous bonding failure between adjacent layers or materials within the pipe construction can all give rise to such a 'leakage path' causing localised gas/liquid accumulations leading to blistering and, ultimately, failure of the flexible pipe. A secure and effective seal is a fundamental safety requirement for high pressure, high temperature bonded pipes. To the best knowledge of the inventor, all manufacturers of bonded hoses have to date employed an elastomer-based sealing compound, e.g. such as that disclosed in GB2329439B (Antal et al).

Elastomers constitute the most flexible, deformable and elastic of the three classes of the non-metallic polymer materials. A behavioural characteristic of all elastomers is that they are inherently permeable to gases and vapours. When used within a flexible pipe for high temperature/high pressure applications, transmission of dissolved gases into microvoids within the elastomeric structure make the pipe more prone to rupture during a rapid depressurisation event, i.e. whereby bubbles form within the microvoids when pressure externally of the pipe is lost. This type of pipe failure is known as 'explosive decompression' and results in a catastrophic failure of the pipe seal and/or lining.

In an effort to minimise instances of 'explosive decompression', flexible pipes for high temperature/high pressure applications typically employ an inner thermoplastic liner to reduce the likelihood of liquid/gas permeation; and an inner strip-wound steel carcass located radially inside the thermoplastic liner to reduce the likelihood of blistering. Whilst such preventative measures are generally effective along the length of a pipe, the sealed connection between a pipe and its coupling (i.e. either a pipe-to-pipe or pipe-to-end-fitting connection) is an area which remains the subject of sealing stresses. Such stresses arise from mechanically applied compression and/or compression arising from the hydrostatic pressure of the fluid being sealed.

In terms of their functional properties, elastomers are soft, substantially elastic, and substantially incompressible. Such characteristics make elastomers suitable for use as primary seals at the interface of a pipe and its coupling. The inherent incompressibility of elastomers means that high stresses can be resisted, and high pressures can be accommodated, when the elastomer material is highly constrained. Elastomeric seals are therefore an automatic choice for high temperature/high pressure applications. Nevertheless, several modes of elastomeric failure or deterioration are well documented, as summarised in Tables 1 and 2 in the Health & Safety Executive Report No. 320 (2005) titled: 'Elastomers for fluid containment in offshore oil and gas production: Guidelines and review' (ISBN 0 7176 2969 4). In Table 1, a failure mode of "Rapid gas decompression or explosive decompression (ED)" is described as follows: "Gas dissolved in the elastomer under high pressure conditions comes out of solution and forms bubbles in the material when the external pressure is lost. The bubbles may grow sufficiently to cause fracture of the material (e.g. seals) or of an interface (e.g. between the liner and adjacent layer in a hose).

In view of the known modes of elastomeric failure or deterioration, only one of which is described above, the present inventor has concluded that there is a requirement for alternative flexible pipe arrangements providing a recognisable improvement over current sealing performance whilst simplifying overall pipe construction and methods of manufacture. In particular, further improvements in terms of the ability of a flexible pipe or hose and any associated coupling to withstand hostile conditions, over a longer period, would be highly desirable.

SUMMARY

According to a first aspect of the present invention, there is provided a synthetic polymer flexible pipe comprising:
(i) an armour layer surrounding an end of the flexible pipe;
(ii) a pipe coupling disposed at the end of the pipe and surrounding the armour layer;
(iii) a sealing area defined by a recessed portion of the pipe coupling; and
(iv) a sealing material disposed in the sealing area;
wherein said pipe end extends into the sealing area and is bonded to the sealing material, and characterised in that the sealing material is non-elastomeric and both the sealing material and the flexible pipe comprise the same class of synthetic polymer selected from the group comprising thermoplastics and thermosets.

Optionally, the flexible pipe and the sealing material each comprise a semi-crystalline thermoplastic material.

In one embodiment, the sealing material is provided as an injectable fluid or molten synthetic polymer.

In an alternative embodiment, the sealing material is provided as a solid meltable seal.

Optionally, the solid meltable seal comprises metallic particles selected from one or more of the group comprising: fibres, coarse grains, chips, or fine powder.

Optionally, different sizes of metallic particles are distributed throughout the solid meltable seal.

Optionally, only an inner liner layer of the flexible pipe comprises a semi-crystalline thermoplastic material which extends into the sealing area.

Optionally, a reinforcement material is provided within the inner liner layer but is not bonded to its semi-crystalline thermoplastic material.

Alternatively, a reinforcement material is provided within the inner liner layer which is fully bonded to its semi-crystalline thermoplastic material by means of an adhesive tie layer.

Optionally, the reinforcement material comprises helically wound steel cord and/or steel wires.

Optionally, two or more separate helically wound steel cord and/or steel wires are arranged in an interlocking fashion.

Optionally, the reinforcement material is arranged within the inner liner layer in a wound fashion at an angle of between 25 degrees and 85 degrees relative to the longitudinal axis of the flexible pipe.

Optionally, the reinforcement material comprises one or more fibre strands and/or rovings selected from the list comprising: glass fibres, carbon fibres, UHmwPE (ultra high molecular weight polyethylene) fibres and aramid fibres.

Optionally, an electrical heating element is provided within the inner liner layer.

Optionally, the electrical heating element comprises one or more materials selected from the list comprising: conductive wires, conductive cables, conductive fabrics or conductive composites.

Optionally, the semi-crystalline thermoplastic material of the inner liner layer is directly bonded to the semi-crystalline thermoplastic material of the sealing material by a polymer-to-polymer bond.

Optionally, the semi-crystalline thermoplastic material of the sealing material is directly bonded to the pipe coupling by a polymer-to-metal bond.

Alternatively, the semi-crystalline thermoplastic material of the sealing material is indirectly bonded to the inner liner layer and/or the pipe coupling via an intermediate adhesive tie layer.

Optionally, the adhesive tie layer also comprises a semi-crystalline thermoplastic material.

Optionally, the semi-crystalline thermoplastic material of the inner liner layer and/or sealing material is a polyvinylidene fluoride (PVDF) material.

Alternatively, the semi-crystalline thermoplastic material of the inner liner layer and/or sealing material is a cross-linked polyethylene (PEX) material.

Alternatively, the semi-crystalline thermoplastic material of the inner liner layer and/or sealing material is a perfluoroalkoxy (PFA) material.

Optionally, the pipe coupling is formed from a metal or a metal alloy.

Optionally, a cylindrical sleeve member is disposed beneath the inner liner at the end of the flexible pipe and cooperates with the pipe coupling proximate the sealing area to support a portion of the inner liner layer extending into the sealing area.

Optionally, an outer surface of the cylindrical sleeve member is inclined at an acute angle relative to the central longitudinal axis of the pipe.

Optionally, the inner liner layer is coupled to the pipe coupling by a crimped or swaged connection.

According to a second aspect of the present invention, there is provided a method of manufacturing a synthetic polymer flexible pipe, comprising the steps of:
(i) providing a pipe coupling comprising a recessed portion defining a sealing area;
(ii) providing a flexible pipe and an armour layer surrounding the pipe;
(iii) providing a sealing material for introduction into the sealing area;
(iv) fitting the pipe coupling to the end of the hose; and (v) establishing a permanent polymer-to-polymer and polymer-to-metal chemical bond within the sealing area between said pipe end and the sealing material; and the pipe coupling and the sealing material respectively;

wherein the sealing material is non-elastomeric and both the sealing material and at least a portion of the flexible pipe are composed of the same class of synthetic polymer selected from the group comprising thermoplastics and thermosets.

Optionally, the method includes the further step of providing a reinforcement means within the flexible pipe.

Optionally, a supporting member is introduced beneath an inner surface of said pipe end before or after the step of fitting the pipe coupling to the pipe end.

In one embodiment, the supporting member is introduced prior to fitting the pipe coupling so as to expand the diameter of the pipe end, the expanded portion being supported proximate the sealing area once the pipe coupling is fitted.

Optionally, the step of establishing a permanent chemical bond within the sealing area involves introducing the sealing material into the sealing area by injection through a passage linking the sealing area to the exterior of the pipe coupling.

In an alternative embodiment, the step of establishing a permanent chemical bond within the sealing area involves introducing the sealing material into the sealing area by mounting a solid meltable seal onto the pipe, proximate the pipe end, before fitting the pipe coupling to the pipe end.

Optionally, the step of fitting the pipe coupling to the pipe end is followed by the step of introducing the supporting member beneath an inner surface of said pipe end, the supporting member incorporating a heater which melts the solid meltable seal within the sealing area.

Optionally, the step of introducing the supporting member involves employing an inflatable supporting member which is temporarily inflated against the inner surface of said pipe end whilst the permanent chemical bond is established.

Alternatively, the step of introducing the supporting member is followed by permanently swaging it against the inner surface of said pipe end.

Optionally, the step of melting the solid meltable seal within the sealing area is accompanied by the step of applying a vacuum to remove substantially all air from the sealing area.

Optionally, the steps of providing a flexible pipe and providing a sealing material each include providing a pipe and sealing material comprising a semi-crystalline thermoplastic material.

Optionally, the step of establishing a permanent chemical bond involves cooling the sealing material.

According to a third aspect of the present invention, there is provided an elastomeric flexible hose comprising:
(i) a semi-crystalline thermoplastic inner liner layer;
(ii) an armour layer surrounding the inner liner layer at an end of the flexible hose;
(iii) a hose coupling disposed at the end of the hose and surrounding the armour layer;
(iv) a sealing area defined by a recessed portion of the hose coupling; and
(v) a semi-crystalline thermoplastic sealing material, or a cross-linked elastomeric sealing material, disposed in the sealing area;

wherein a portion of the inner liner layer at said hose end extends into the sealing area and is bonded to the sealing material, and characterised in that a reinforcement material is provided within the inner liner layer.

Optionally, the reinforcement material is not bonded to the semi-crystalline thermoplastic material.

Optionally, the reinforcement material comprises helically wound steel cord and/or steel wires.

Optionally, two or more separate helically wound steel cord and/or steel wires are arranged in an interlocking fashion.

Optionally, the reinforcement material is arranged within the inner liner layer in a wound fashion at an angle of between 25 degrees and 85 degrees relative to the longitudinal axis of the flexible hose.

Optionally, the reinforcement material comprises one or more fibre strands and/or rovings selected from the list comprising: glass fibres, carbon fibres, UHmwPE (ultra high molecular weight polyethylene) fibres and aramid fibres.

Optionally, an electrical heating element is provided within the inner liner layer.

Optionally, a cylindrical sleeve member is disposed beneath the inner liner at the end of the flexible hose and cooperates with the hose coupling proximate the sealing area to support a portion of the inner liner layer which extends into the sealing area.

In one embodiment, the sealing material is provided as an injectable fluid or molten synthetic polymer.

In an alternative embodiment, the sealing material is provided as a solid meltable seal.

Optionally, the solid meltable seal comprises metallic particles selected from one or more of the group comprising: fibres, coarse grains, chips, or fine powder.

Optionally, different sizes of metallic particles are distributed throughout the solid meltable seal.

Optionally, the inner liner layer is coupled to the hose coupling by a crimped or swaged connection.

Optionally, all adjacent layers of the flexible hose are partially or fully bonded in a permanent connection.

Optionally, an outer cover layer surrounds the armour layer and comprises a semi-crystalline thermoplastic material.

Optionally, a reinforcement material is provided within the outer cover layer.

Optionally, the reinforcement material comprises one or more materials selected from the list comprising steel cord, steel strands, fibre strands and fibre rovings.

Optionally, the fibre strands or rovings comprise one or more fibres selected from the list comprising glass fibres, carbon fibres, UHmwPE (ultra high molecular weight polyethylene) fibres and aramid fibres.

Optionally, the reinforcement material within the outer cover is aligned in a uni-directional, bi-directional or multi-directional manner.

Optionally, the reinforcement material within the outer cover layer is provided within a fabric or a plied tape.

Optionally, a stainless steel interlock cover layer surrounds the exterior of the flexible hose.

According to a fourth aspect of the present invention, there is provided a method of manufacturing an elastomeric flexible hose, comprising the steps of:
(i) providing a hose coupling comprising a recessed portion defining a sealing area;
(ii) providing a hose comprising a semi-crystalline thermoplastic inner liner layer, and an armour layer surrounding the inner liner layer at an end of the flexible hose;
(iii) providing a semi-crystalline thermoplastic sealing material, or a cross-linked elastomeric sealing material, for introduction into the sealing area; (iv) providing a reinforcement material within the inner liner layer;
(v) fitting the pipe coupling to the end of the hose; and (vi) establishing a permanent chemical bond within the sealing area between the hose end and the sealing material; and the hose coupling and the sealing material respectively.

Optionally, the step of establishing a permanent chemical bond within the sealing area involves introducing the sealing material into the sealing area by mounting a solid meltable seal proximate the hose end before fitting the hose coupling to the hose end.

Optionally, the step of fitting the hose coupling to the hose end is followed by the step of introducing a supporting member beneath an inner surface of said hose end, the supporting member incorporating a heater which melts the solid meltable seal within the sealing area.

Optionally, the step of introducing the supporting member involves employing an inflatable supporting member which is temporarily inflated against the inner surface of said hose end whilst the permanent chemical bond is established.

Alternatively, the step of introducing a supporting member is followed by permanently swaging it against the inner surface of said hose end.

Optionally, the step of melting the solid meltable seal within the sealing area is accompanied by the step of applying a vacuum to remove substantially all air from the sealing area.

Use of the words "preceded by", "followed by", "before", "after" are not necessarily intended to mean immediately "preceded by" etc., unless the context so demands.

BRIEF DESCRIPTION OF THE DRAWINGS

Embodiments of the present invention will now be described, by way of example only, with reference to the accompanying drawings, in which:

FIG. 1 is a cross-sectional schematic view showing a pipe or hose coupling fitted over the end of a flexible pipe or hose;

FIG. 2a is a cross-sectional schematic view showing the sealing area of FIG. 1 in more detail;

FIG. 2b is a cross-sectional schematic view showing the sealing area of FIG. 2a filled with a non-elastomeric sealing material;

FIG. 8a is a cross-sectional schematic view showing a pipe or hose coupling fitted over the end of the meltable sealing ring of FIG. 7;

FIG. 8b is a cross-sectional schematic view showing a pipe or hose coupling fitted over the end of an alternative L-shaped meltable sealing ring;

FIG. 12a is a cross-sectional schematic view showing the sealing area of FIG. 8b in more detail prior to activation of an induction heater; and FIG. 12b is a cross-sectional schematic view showing the sealing area of FIG. 8b in more detail after activation of an induction heater.

DETAILED DESCRIPTION

Figure 3B:
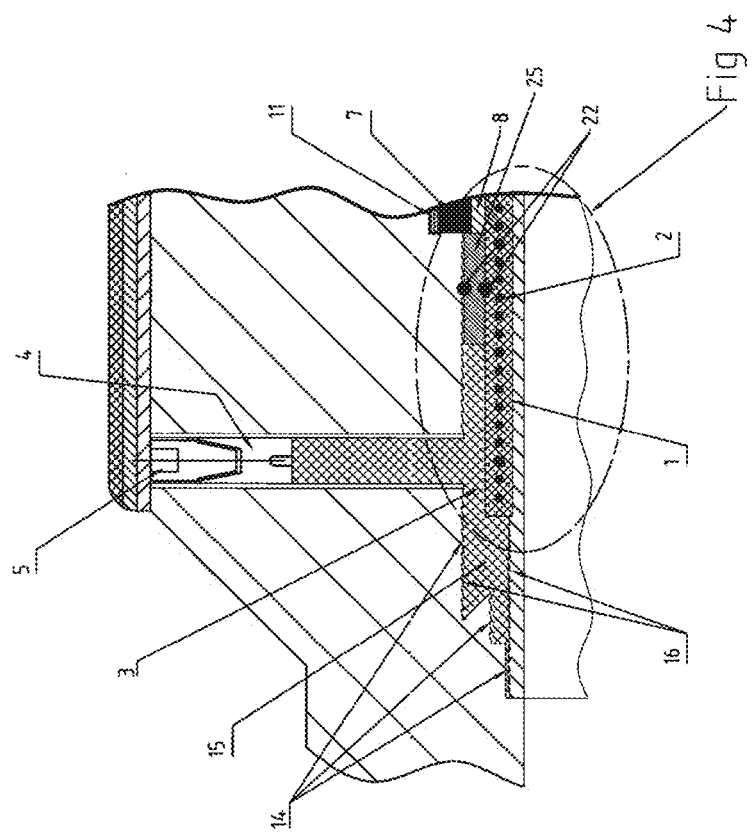
FIG. 3b is a cross-sectional schematic view showing the alternative sealing area of FIG. 3a filled with a non-elastomeric sealing material.

FIG. 1 shows a schematic cross-sectional view of an end of a flexible hose surrounded by an annular hose coupling 13. The innermost layer of the flexible hose is a semi-crystalline polymer inner liner 1 within which is embedded a reinforcement material 2. In some embodiments (not shown) a flexible stainless steel interlock or carcass may be disposed radially within (i.e. beneath) the inner liner 1 and chemically bonded or crimped thereto to form the innermost layer.

The inner liner 1 may be formed from any suitable type of semi crystalline thermoplastic, e.g. polymers derived from polyolefins. Possible options include, but are not necessarily limited to: polypropylene; fully or partially cross-linked polyethylene; polyamides such as polyamide-polyimide; polyimide (PI) (PA6, PA11 or PA12); polyurethanes (PU); polyureas; polyesters; polyacetals; polyethers such as polyethersulphone (PES); polyoxides; polysulfides such as polyphenylene sulphide (PPS); polysulphones such as polyarylsulphone (PAS); polyacrylates; polyethylene terephthalate (PET); polyether-ether-ketones (PEEK); polyvinyls; polyacrylonitriles; polyeterketoneketone (PEKK). Further options include co-polymers of the foregoing such as fluorous polymers; homo-polymers or copolymers of, for example, trifluoroethylene (VF3) or tetrafluoroethylene; copolymers or terpolymers comprising two or more different members selected from VF2, VF3, chlorotrifluorethylene, tetrafluoroethylene, hexafluoropropene or hexafluoroethylene; polymer blends comprising one or more of the above mentioned polymers and composite materials, such as an abovementioned polymer compounded with reinforcement fibres such as glassfibers and/or carbon fibers and/or aramid fibers. The choice of semi crystalline thermoplastic for a given application will depend on the specific expected service conditions of the flexible pipe and perhaps other considerations such as ease of manufacture and cost.

The inner liner 1 is surrounded by a consolidating fabric layer 8. The fabric layer 8—which may include rubber—is surrounded by a steel sleeve 7 which increases in thickness towards the end of the flexible hose. The steel sleeve 7 is surrounded by one or more armour layers 9 comprising of, for example, one or more helically wound layers of steel cord, steel wires or glass/carbon/aramid fibre strands or rovings embedded within a rubber cushioning layer 10. The armour layers 9 and cushioning layers 10 may be provided in the form of tape which is wound around the inner liner 1 in one or more plies. Different plies may be wound at different winding angles.

Figure 4B:
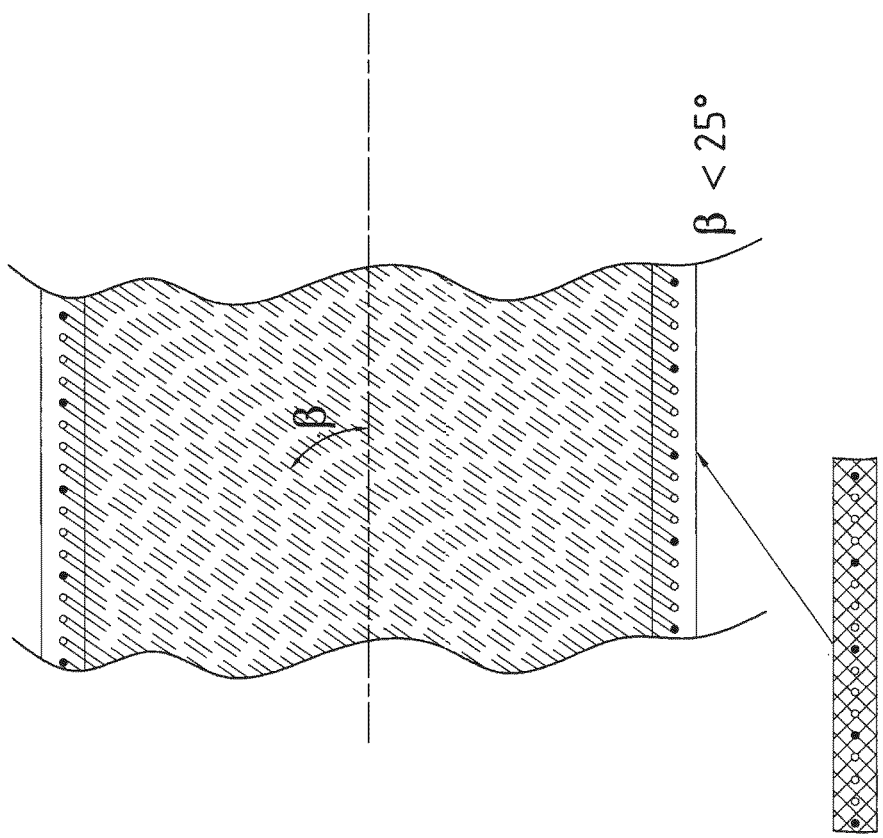
FIG. 4b is a cross-sectional schematic view showing an alternative lay angle and a heating means within the inner liner.
Figure 4A:
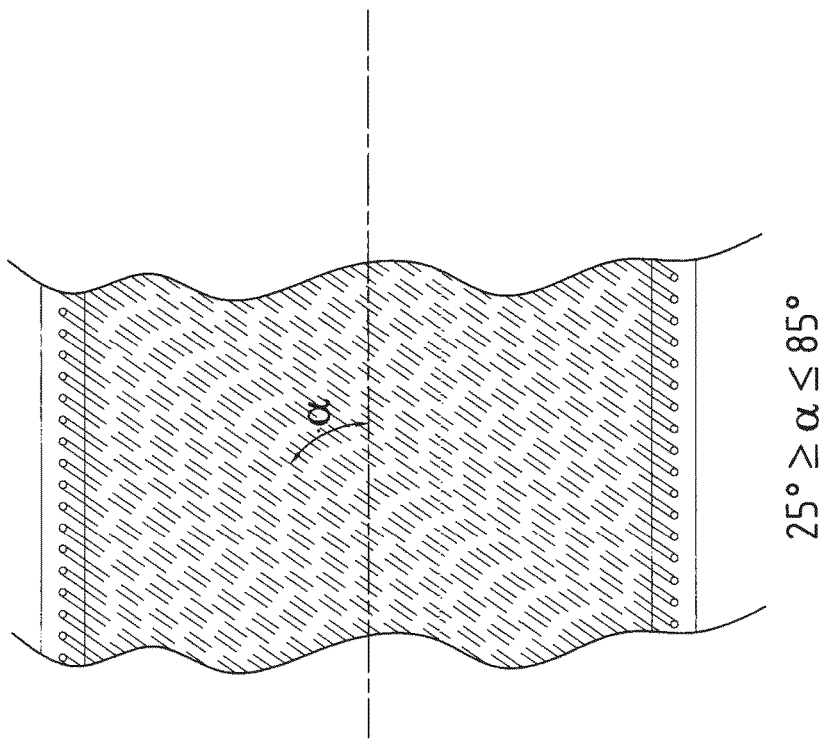
FIG. 4a is a cross-sectional schematic view showing the lay angle of reinforcement within the inner liner.

If present, the reinforcement material 2 within the inner liner 1 may take the form of helically wound steel cord, steel wires or fibre strands or rovings with a winding angle of between 25 degrees and 85 degrees relative to the longitudinal axis 100 of the flexible hose (see FIG. 4a). Preferably, the winding angle will be as close as possible to the neutral angle of 54-55 degrees. The winding angle may be adjusted depending on particular requirements. However, the winding angle will normally not be less than 25 degrees or more than 85 degrees to ensure controlled bending behaviour. Exceptionally, the winding angle may be less than 25 degrees if the application requires the inner liner 1 to be collapsible (see FIG. 4b). In that specific case the embedded reinforcement layers act as a stiffener for the inner liner 1 limiting the elongation to a value of less than the elongation threshold of the inner liner's thermoplastic material. In one embodiment, one or more additional layers of the same reinforcement material 2 may be wound at different angles with compatible thermoplastic materials over-extruded to fully embed the respective additional reinforcement layers.

The steel cord and/or steel wires may be wound such that adjacent windings are interlocked. The reinforcement material 2 may also comprise fibre strands and/or rovings selected from the list comprising: glass fibres, carbon fibres, UHmwPE (ultra high molecular weight polyethylene) fibres (Dyneema) and aramid fibres. It will be understood that this list is non-exclusive. The reinforcement material may be a textile weave or fabric made up of one or more of the aforementioned materials. The reinforcement material 2 may be provided in the form of a tape containing one or more of the abovementioned materials. The reinforcement material 2 may be over-extruded with the same semi-crystalline thermoplastic material from which the inner liner 1 is made. It is preferable that the reinforcement material 2 may accommodate shear deformation caused by the application of loads, e.g. during bending. Accordingly, the reinforcement material 2 is optionally not bonded to the thermoplastic material of the inner liner 1 within which it is embedded.

A source of heat may be incorporated into the inner liner 1, for example by adding an electric heat tracing layer above and/or below and/or amongst the reinforcement material 2 (also shown in FIG. 4b). It is essential that the generated heat is maintained well below the melting point of the thermoplastic material of the inner liner 1. The heat tracing elements may comprise separate conductive wires or utilise the steel cables or steel based fabrics or composite materials of the reinforcement material 2 itself.

The internal diameter of the annular hose coupling 13 increases in a generally stepwise fashion from left to right as viewed in FIG. 1. A recessed portion 3 is provided at one end of the body of the hose coupling 13 nearest its narrowest internal diameter. The term "recessed portion" is to be understood in this context as defining the inner enlarged diameter space bounded by the hose coupling body, the cylindrical sleeve 6, and the innermost layers 1, 8 of the flexible hose, i.e. as indicated with the closely spaced diagonal shading in FIGS. 1 and 5.

The end portion of the flexible hose is prepared to receive the hose coupling in a conventional manner, for example by curing and stripping back to progressively expose its underlying layers. A cylindrical inner sleeve 6 is disposed within the end portion of the flexible hose. The internal diameter defined by the inner sleeve 6 is selected so as to be substantially equal to the internal diameter of the flexible hose defined by its inner liner 1. The outer surface of the inner sleeve 6 tapers towards the longitudinal axis 100. As the inner sleeve 6 is inserted into the end of the flexible hose its tapered portion(s) engage the innermost surface of the inner liner 1. Progressive insertion of the inner sleeve 6 into the flexible hose causes the internal diameter of the inner liner 1 to expand as it is forced up the tapered surface(s) of the inner sleeve 6.

The recessed portion 3 of the hose coupling 13 is partially closed by the inner sleeve 6 when the hose coupling is fitted over the expanded end of the flexible hose. Once positioned over its end, the hose coupling may optionally be crimped onto the flexible hose from the outside. An epoxy resin 11 is introduced—via end caps 12—into the area between the inner surface of the hose coupling body 13 and the stripped back layers of the flexible hose.

Once the hose coupling is in place, the inner sleeve 6 therefore supports the expanded end portion of the inner liner 1 within the recessed portion 3 of the hose coupling body 13 together with an end of the surrounding fabric layer 8 and steel sleeve 7. All three layers are compressed—for example by crimping or swaging from the inside—between the outer surface of the inner sleeve 6 and an opposing surface of the hose coupling body 13 in a manner which closes off the path between the recessed portion 3 and the internal cylindrical volumes of the flexible hose and the coupling body 13.

The internal volume of the recessed portion 3—hereinafter "the sealing area"—is bounded by the inner wall of the coupling body 13 and—in a preferred embodiment—the radial outer surface of the inner sleeve 6. One surface portion of the inner wall of the coupling body 13 is inclined at an acute angle relative to the longitudinal axis 100 of the flexible hose. The acute angle may be approximately 45 degrees. An end portion of the flexible hose—i.e. its inner liner 1 and fabric layer 8—extends into the sealing area 3 as shown in greater detail in FIG. 2a.

Figure 3A:
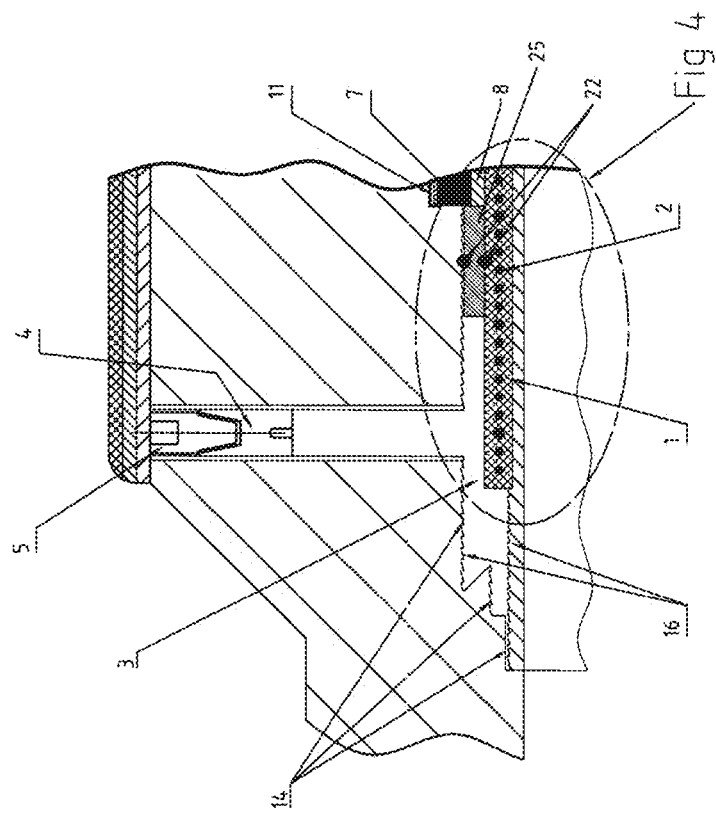
FIG. 3a is a cross-sectional schematic view showing an alternative sealing area allowing for more mechanical grip.

FIGS. 3a and 3b show an alternative sealing area 3 whereby the inner wall of the coupling body 13 and the radial outer surface of the inner sleeve 6 are provided with a serrated surface profile 16. The serrations 16 provide an enhanced mechanical connection between the surfaces within the sealing area 3 and the sealing material 15. As shown in FIG. 3b, the presence of the serrations 16 may mean that the tie layer 14 need only be applied to any non-serrated surfaces within the sealing area 3. One surface portion of the inner wall of the coupling body 13 within the sealing area 3 is inclined at an obtuse angle relative to the longitudinal axis 100 of the flexible hose. The obtuse angle may be approximately 135 degrees. This serves to increase the surface area of the sealing bond between the sealing material 15 and the coupling body 13 and hence further strengthens the bond.

A passage is provided through an exterior surface of the hose coupling body 13 to provide access to the sealing area 3 via a removable end cap 5. In one embodiment, a non-elastomeric sealing material can be introduced into the sealing area 3 through the passage using a built-in nipple connector 4. As shown in FIG. 2b, the sealing material 15 completely fills the sealing area 3 and may be cured to establish a permanent polymer-to-polymer and polymer-to-metal chemical bond between the end portion of the inner liner 1 and the sealing material 15; and the surfaces of the hose coupling body 13 and the sealing material 15 respectively. As best shown in FIGS. 2a and 3a, a steel or synthetic polymer ring 25 carrying an elastomeric sealing surface 22 is provided between an inner surface of the hose coupling body 13 and the inner layer 1 of the flexible hose. This performs the dual functions of: (i) preventing epoxy resin, introduced via the end caps 12, from entering the sealing area; and (ii) providing a compressive force to the layers between it and the inner sleeve 6 (i.e. via the inner liner 1 and the reinforcement material 2, if present).

For some types of sealing material 15, complete bonding between the respective surfaces within the sealing area 3 necessitates coating them with a tie layer 14 before introducing the sealing material 15. The tie layer may be applied using conventional electrostatic coating techniques. Application of a tie layer may also add thermal insulation and mechanical strength to the connection within the sealing area 3.

In one embodiment, the sealing material 15 comprises a non-elastomeric semi-crystalline thermoplastic material such as an injection grade polyvinylidene fluoride (PVDF), perfluoroalkoxy (PFA) or a cross-linked polyethylene (PEX). In one embodiment, the sealing material 15, the inner liner 1 and the tie layer 14 each comprise a non-elastomeric semi-crystalline thermoplastic material. Ideally, the inner liner 1, the tie layer 14, and the sealing material 15 are formed from the same non-elastomeric semi-crystalline thermoplastic material so as to create a single homogeneous polymer structure providing the best possible chemical bond between the hose coupling body 13 and the inner liner 1 within the sealing area 15.

The homogeneous polymer structure, e.g. based on the PVDF, PFA or PEX materials discussed above, will be substantially liquid impervious at a pressure difference of the order of 5-10 bar. Consequently, any reinforcement material 2 embedded within the inner liner 1 is protected from corrosion. If the selected polymer structure is formed from a more liquid permeable thermoplastic material then a fibre-based reinforcement material 2 (as described above) may be utilised as an alternative to steel. Where fibre-based material is undesirable, galvanised steel wire or cable may be employed as a means of protecting against corrosion.

All adjacent layers of the flexible hose are permanently chemically bonded to each other in a manner known in the art. However, in a preferred embodiment it is important that the bonding process employed does not affect the non-bonded character of the reinforcement material 2 within the flexible hose's inner liner 1. For example, the thermoplastic material, e.g. PEX, may become cross-linked upon adding the reinforcement material 2.

The thermoplastic material of the inner liner 1 is permanently and fully chemically bonded to the surrounding rubber encased armour layers 9, 10. Consequently, shear deformation of the thermoplastic material of the inner liner 1 during bending and the application of combined loads may be minimised. The PVDF, PFA or PEX materials discussed above have sufficient bonding and mechanical properties for high pressure applications. If more inert and temperature resistant materials like partially or fully fluorinated thermoplastics are employed, additional production steps may be required to obtain full bonding. The term full bonding is to be understood as meaning that either the mechanical strength limit of the elastomer rubber or that of the thermoplastic layer is exceeded before the bond is broken. Since deformation and compound loadings on a fully bonded pipe are taken up by both the inner liner 1 and the surrounding rubber encased armour layers 9, 10, this helps to avoid known failure mechanisms and provides a significant performance improvement in flexible hoses.

The external layers of the flexible hose surrounding the rubber encased armour layers 9, 10 comprise an anti-wear layer 17 and an outer cover 18. These layers may be applied in the form of tapes and may comprise uni-directional, bi-directional or multi-directional reinforcement material selected from one or more of the types already described above. The external layers may be over-extruded with a final thermoplastic layer. For example, an impact resistant layer 19 in the form of a UHmwPE (ultra high molecular weight polyethylene) tape may be applied to provide extra impact resistance and anti-wear characteristics. An alternative arrangement (shown in FIG. 8*b*) may employ fibre reinforced or hybrid steel/fibre fabric layers 26 in addition to, or instead of, tapes as an impact resistant layer. The external layers extend over the coupling body 13 of the attached hose coupling.

Figure 5:
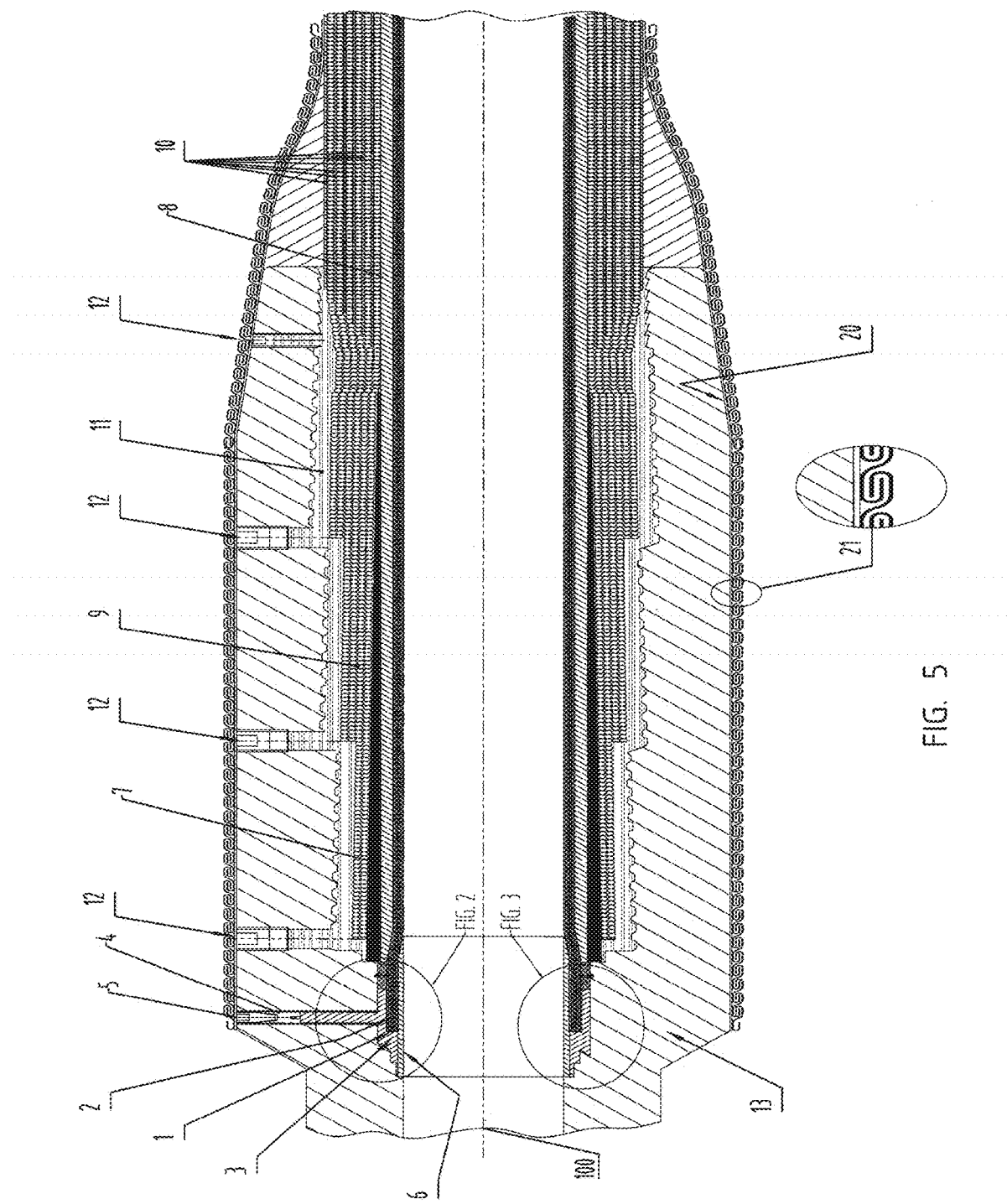
FIG. 5 is a cross-sectional schematic view showing a hose coupling fitted over the end of a flexible pipe or hose having an alternative outer reinforcement structure.

An alternative arrangement for the external layer of the flexible hose is shown in FIG. 5 whereby stainless steel interlock 21 is employed over an intermediate rubber cushion layer 20. This arrangement may be more susceptible to damage within the moon pool area of a drillship or platform than the alternative arrangement shown in FIG. 1.

Figure 6:
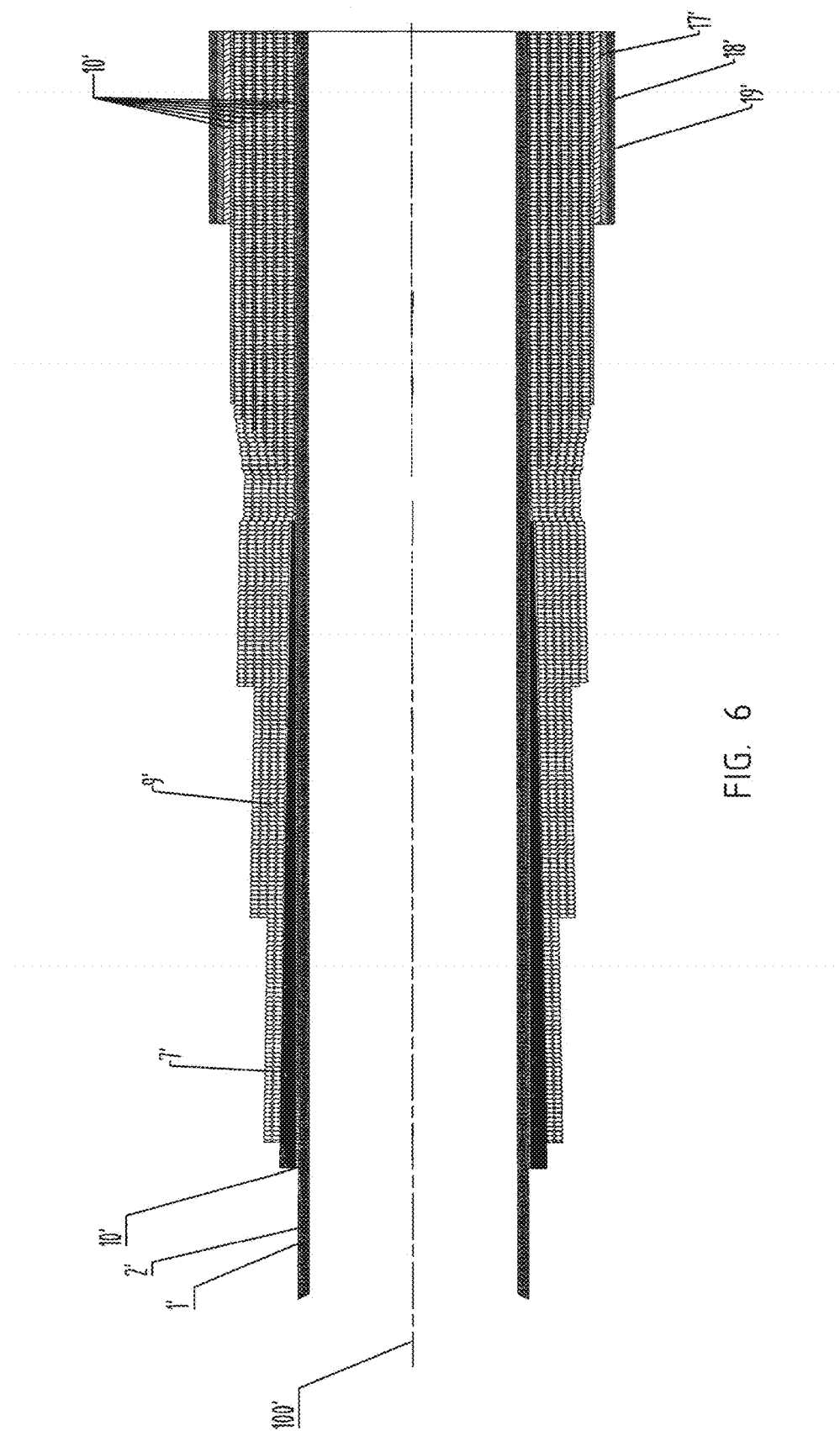
FIG. 6 is a cross-sectional schematic view showing a pipe or hose build-up whereby the constituent layers have been progressively stripped back towards the pipe/hose end in preparation for fitting a pipe/hose coupling thereto.

An alternative manner of effecting a sealed connection between a hose and a metallic coupling member will now be described with reference to FIGS. 6 to 12*b*. FIG. 6 is a cross-sectional schematic view showing the constituent layers of a hose which is substantially similar to that illustrated in FIGS. 1 and 5. The constituent layers have been progressively stripped back towards the free end of the hose (i.e. at the left hand side of FIG. 6) in preparation for fitting a hose coupling thereto in the manner described below.

The innermost layer of the flexible hose is a semi-crystalline polymer inner liner 1' within which is embedded a reinforcement material 2'. The inner liner 1' is exposed at the free end of the hose and formed with an angled chamfer at its distal end which is complementary in shape to an annular seat formed in the hose coupling 13' (see the left hand side of the recess in FIGS. 11*a* to 12*b*). The inner liner 1' may be formed from any suitable type of semi crystalline thermoplastic, e.g. polymers derived from polyolefins as already described above with reference to the embodiment of FIG. 1. The various layers which surround the inner liner 1' are also described above with reference to the embodiment of FIG. 1 and so need not be replicated here. However, as shown in FIG. 6 to 12*b*, it is possible to remove the fabric layer 8 (shown in the embodiment of FIGS. 1 to 5) because the inner reinforcement 2' can be designed to take up its structural function.

Figure 7:
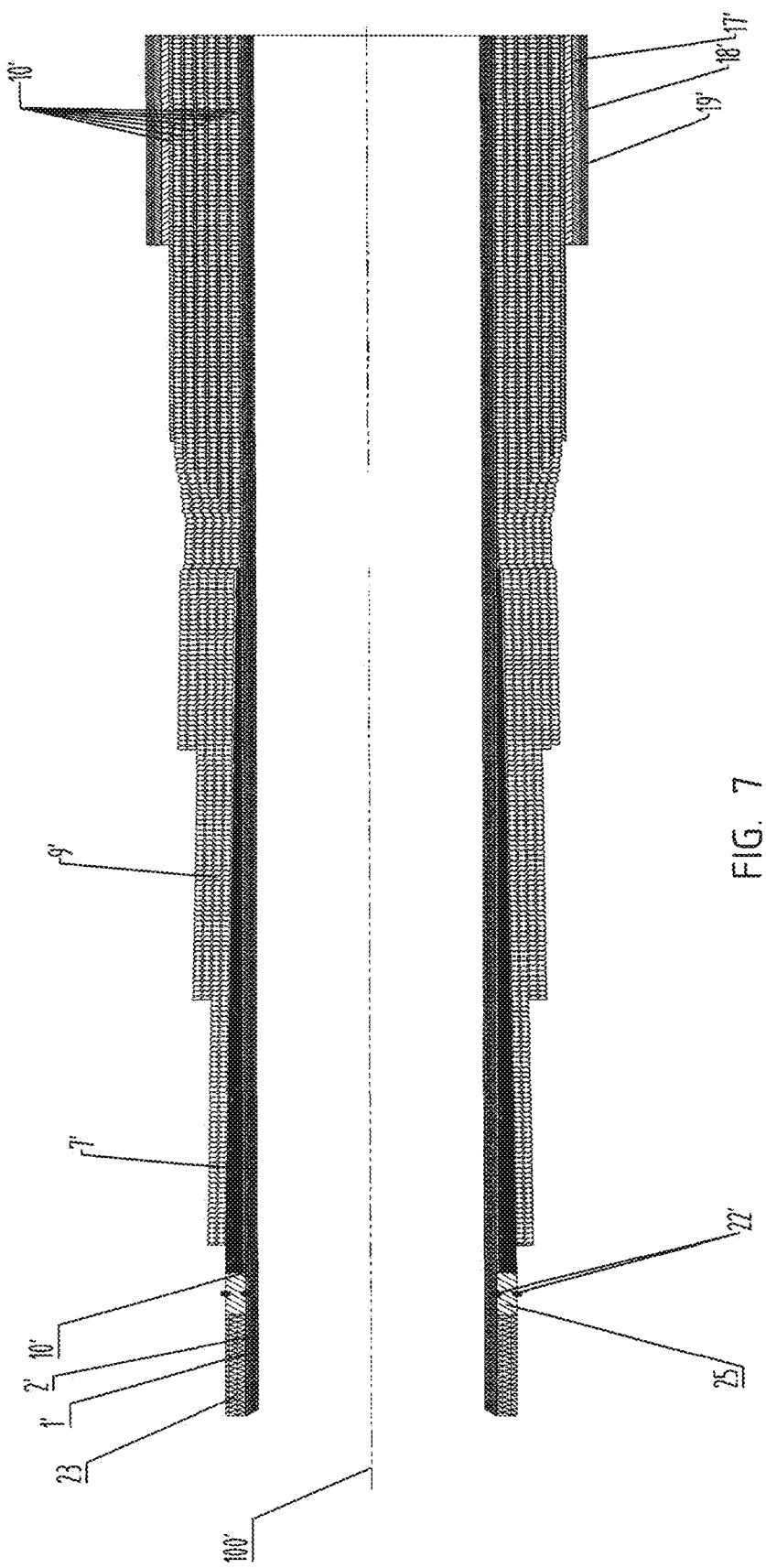
FIG. 7 is a cross-sectional schematic view showing a pipe or hose build-up of FIG. 6 with a meltable sealing ring mounted to its free end.

FIG. 7 shows a meltable sealing ring 23 which is slidably mounted on the exposed portion of the inner liner 1' at the free end of the hose. The meltable sealing ring 23 is a hybrid of semi-crystalline thermoplastic material (preferably the same type as the inner liner) and metallic particles selected from one or more of the group comprising: fibres, coarse grains, chips, or fine powder. The particles may be provided as a mixture of different sizes to ensure an even distribution throughout the solid meltable seal.

FIG. 8*a* shows an annular hose coupling 13' which has been push-fitted over the free end of the hose and properly aligned with the central longitudinal axis 100'. The hose coupling 13' may be bonded to the stripped back layers of the flexible hose. This is achieved in a known manner by first heating the hose coupling 13' (e.g. by means of an induction coil) and introducing an epoxy resin through the end caps 12'. In order to prevent epoxy resin from entering into the sealing area, a metal or polymer ring 25' carrying an elastomer sealing surface 22' is mounted above the inner liner 1' adjacent to the steel sleeve 7'. The internal diameter of the annular hose coupling 13' increases in a generally stepwise fashion from left to right as viewed in FIG. 8*a*. A recessed portion 3' is provided at one end of the body of the hose coupling 13' nearest its narrowest internal diameter and defines a sealing area.

The term "recessed portion" is to be understood in this context as defining the inner enlarged diameter space bounded by the hose coupling body and the inner liner 1' of the flexible hose, i.e. including the volume within which the solid meltable sealing ring 23 is seated. The radial passage closed by the end cap 5' is initially empty as shown more clearly in FIG. 1a. A nipple connector 4' is provided inside this passage to allow connection of a vacuum hose. The recessed portion may be provided with an annular seat within which an end portion of the solid meltable sealing ring 23 may be received (see the left hand side of the recessed portion 23' in FIGS. 8 to 12b). This ensures a secure mechanical lock between the annular hose coupling 13' and the meltable sealing ring 23 prior to it being heated as described below.

FIG. 8b is similar to FIG. 8a but shows an alternative arrangement whereby the meltable sealing ring 23' is L-shaped in cross-section so as to extend over both the outer surface and the distal end of the inner liner 1' at the free end of the hose. This arrangement is shown in more detail in FIGS. 12a and 12b prior to, and after, activation of the induction heater respectively.

Figure 9:
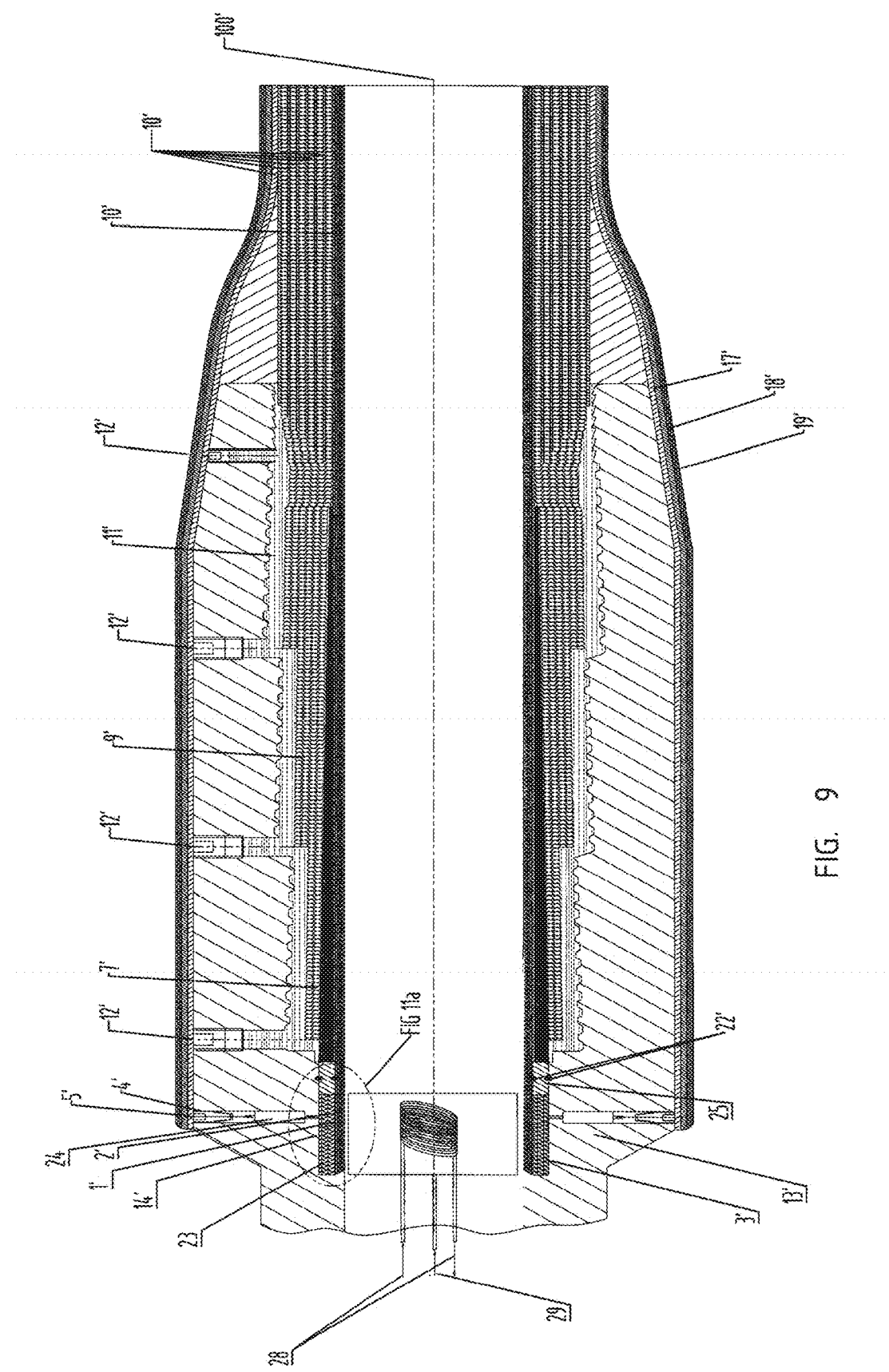
FIG. 9 is a cross-sectional schematic view corresponding to FIG. 8a showing a supporting member incorporating an induction heater.

FIG. 9 shows the same arrangement as FIG. 8a whereby a supporting member—in the form of a sealed silicone rubber hose incorporating a heatable induction coil—has been introduced beneath the inner liner 1'. In use, the sealed silicone rubber hose is inflated using an air supply line 29 so as to apply a radial supporting pressure against the cylindrical inner wall of the inner liner 1'. Before and/or during activation of the heatable induction coil via electrical connections 28, substantially all air is removed from the recessed portion 3'. By maintaining vacuum conditions through the nipple connector 4' within the recessed portion 3' when the heatable induction coil is activated, all air bubbles are removed. The heating process continues until the solid meltable sealing ring 23 becomes molten and increases in volume to fill the recessed portion 3' to a predetermined level as shown more clearly in FIG. 11b. This can be visually verified by checking the level of the sealing material through the end cap 5'. The duration and temperature of heating will vary depending upon hose design and material choices. During this process, the inflated rubber hose ensures that the cured seal is correctly aligned.

A tie layer 14' may be applied to the inner surface of the hose coupling 13' to provide a more reliable cohesive bond between the sealing material and the metallic (e.g. steel) hose coupling. The choice of tie layer 14' will vary depending upon the chemical make-up of the thermoplastic material used in the sealing material. The cohesive bond, between the sealing material and the surface of the hose coupling 13' within the sealing area, must be able to withstand the tendency for the inner liner 1' to creep under high temperatures and/or pressures.

Figure 10:
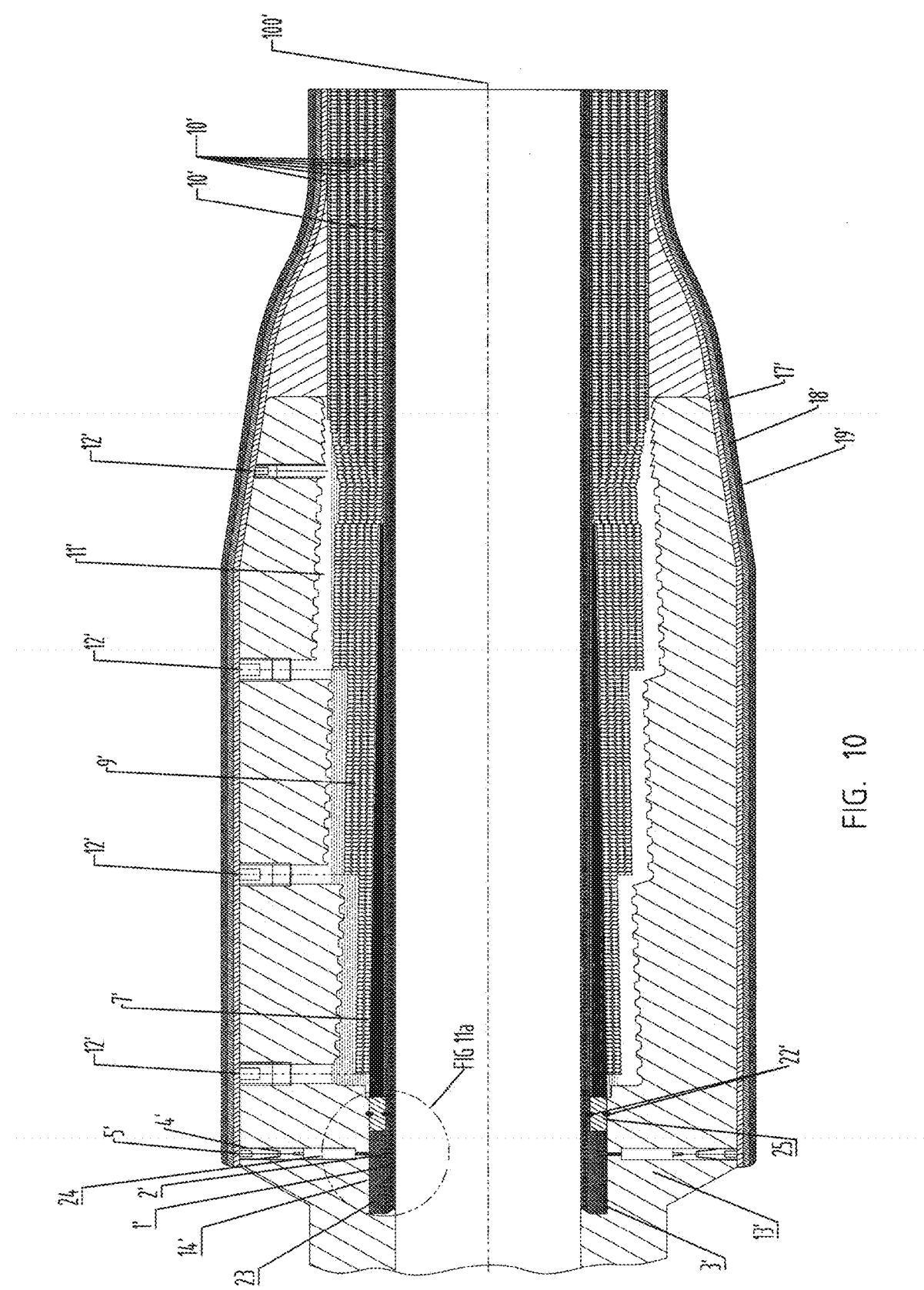
FIG. 10 is a cross-sectional schematic view corresponding to FIG. 8a showing the establishment of chemical bond in the sealing area after removal of the supporting member shown in FIG. 9.
Figure 11A:
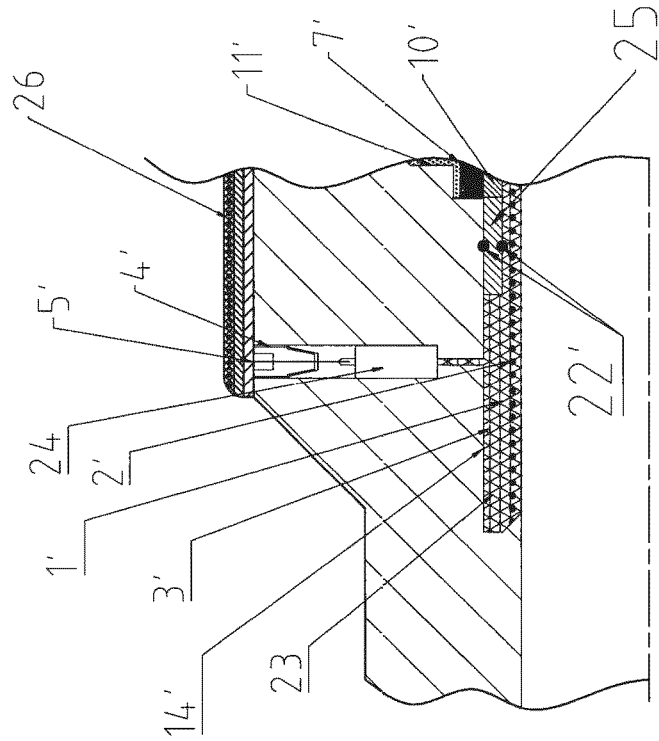
FIG. 11a is a cross-sectional schematic view showing the sealing area of FIG. 8a in more detail.
Figure 11B:
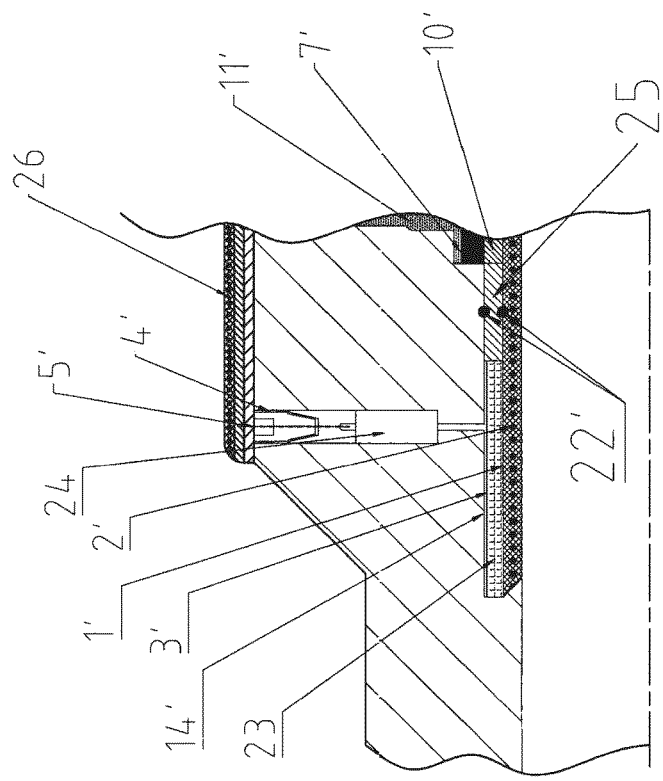
FIG. 11b is a cross-sectional schematic view showing the sealing area of FIG. 10 in more detail.

FIG. 10 is a cross-sectional schematic view corresponding to FIG. 8b now showing the establishment of chemical bond in the sealing area after removal of the sealed silicone rubber hose incorporating a heatable induction coil as shown in FIG. 9.

It will be appreciated that the various embodiments of the present invention provide a number of advantages over existing arrangements for connecting a flexible hose to a hose coupling. Most significantly, by providing a non-elastomeric semi crystalline sealing material within the sealing area which is the same (or chemically similar) as that of the inner liner of the flexible hose, a homogeneous polymer structure extends from the flexible hose all the way into the hose coupling, i.e. the liner becomes the seal and the seal is the liner. This structure provides a moisture-proof and gas-tight barrier more capable of withstanding harsh production environments than known prior art products.

Also, by embedding reinforcement material within the inner liner layer of the flexible hose, its connection with a hose coupling can be further strengthened and improved. The integration of a reinforcement material into the inner liner layer closer to the core of the flexible hose makes the bonded hose stronger and thus enables downscaling, if desired, of the outer armour layers. For example, the number of rubber outer reinforcement plies or the size thereof may be reduced. Consequently, it becomes possible to achieve a more lightweight and/or flexible hose system. A properly designed reinforced inner layer can also replace the need for an inner carcass because the supporting function is now incorporated within the inner liner layer itself.

The embodiment of FIGS. 6 to 11b provides the further advantage of eliminating all air pockets from the sealing area. This arrangement also obviates the need for inserting the inner cylindrical supporting sleeve 6 shown in FIGS. 1 to 3 and 5. The process of expanding the sleeve to swage the overlying sealing area is also eliminated. Instead, the inner liner 1' of the flexible hose becomes part of the seal and so the process steps are significantly simplified and shortened.

The various embodiments of the present invention provide a sealing arrangement that overcomes, or at least ameliorates, one or more of the following problems associated with elastomeric seals. Firstly, high temperatures cause softening of elastomers which results in an increased rate of liquid/gas diffusion, thus accelerating chemical degradation. This temperature-related issue can arise independently of high pressure considerations, although of course high pressures will further exacerbate the problem.

Modifications and improvements may be made to the foregoing without departing from the scope of the invention as defined by the accompanying claims. For example, a possible alternative to the aforementioned meltable seal is a susceptor tape which could be wound around the outer surface of the flexible hose and its liner prior to fitting of the hose coupling.

The invention claimed is:

1. An elastomeric flexible hose for transportation of hydrocarbon liquids or gases, the elastomeric flexible hose comprising:
   (i) a semi-crystalline thermoplastic inner liner layer;
   (ii) an armour layer surrounding the inner liner layer at an end of the flexible hose;
   (iii) a metallic hose coupling disposed at the end of the hose and surrounding the armour layer;
   (iv) a sealing area defined by a recessed portion of the metallic hose coupling;
   (v) a semi-crystalline thermoplastic sealing material, or a cross-linked elastomeric sealing material, disposed in the sealing area;
   wherein a portion of the inner liner layer at said hose end extends into the sealing area and is bonded to the sealing material; and
   wherein a helically wound reinforcement material is provided wholly within the inner liner layer and further in that the inner liner layer is bonded to the semi-crystalline thermoplastic sealing material, the semi-crystalline thermoplastic sealing material being bonded to an inner surface of the metallic hose coupling within the sealing area by a tie layer that is coated to the inner surface of the metallic hose coupling.

2. The flexible hose according to claim 1, wherein the reinforcement material is not bonded to the semi-crystalline thermoplastic material.

3. The flexible hose according to claim 1, wherein the reinforcement material comprises helically at least one of wound steel cord and steel wires, or at least one of one or more fiber strands and rovings selected from the group consisting of glass fibers, carbon fibers, ultra high molecular weight polyethylene (UHmwPE) fibers, and aramid fibers.

4. The flexible hose according to claim 3, wherein at least one of separate helically wound steel cord and steel wires are arranged in an interlocking fashion.

5. The flexible hose according to claim 1, wherein the reinforcement material is arranged within the inner liner layer in a wound fashion at an angle of between 25 degrees and 85 degrees relative to a longitudinal axis of the flexible hose.

6. The flexible hose according to claim 1, wherein an electrical heating element is provided within the inner liner layer.

7. The flexible hose according to claim 1, wherein a cylindrical sleeve member is disposed beneath the inner liner at the end of the flexible hose and cooperates with the hose coupling proximate the sealing area to support a portion of the inner liner layer which extends into the sealing area.

8. The flexible hose according to claim 1, wherein the sealing material is provided as an injectable fluid or molten synthetic polymer.

9. The flexible hose according to claim 1, wherein the sealing material is provided as a solid meltable seal.

10. The flexible hose according to claim 9, wherein the solid meltable seal comprises metallic particles selected from the group consisting of fibres, coarse grains, chips, and fine powder.

11. The flexible hose according to claim 10, wherein different sizes of metallic particles are distributed throughout the solid meltable seal.

12. The flexible hose according to claim 1, wherein the inner liner layer is coupled to the hose coupling by a crimped or swaged connection.

13. The flexible hose according to claim 1, wherein all adjacent layers of the flexible hose are partially or fully bonded in a permanent connection.

14. The flexible hose according to claim 1, wherein an outer cover layer surrounds the armour layer and comprises a semi-crystalline thermoplastic material.

15. The flexible hose according to claim 14, wherein a reinforcement material is provided within the outer cover layer.

16. The flexible hose according to claim 15, wherein the reinforcement material comprises one or more materials selected from the group consisting of steel cord, steel strands, fiber strands, and fiber rovings.

17. The flexible hose according to claim 16, wherein the fiber strands or rovings comprise one or more fibers selected from the group consisting of glass fibers fibres, carbon fibers, UHmwPE (ultra high molecular weight polyethylene) fibers, and aramid fibers.

18. The flexible hose according to claim 15, wherein the reinforcement material within the outer cover is aligned in a uni-directional, bi-directional, or multi-directional manner.

19. The flexible hose according to claim 15, wherein the reinforcement material within the outer cover layer is provided within a fabric or a plied tape.

20. The flexible hose according to claim 1, wherein a stainless steel interlock cover layer surrounds an exterior of the flexible hose.

21. A method of manufacturing an elastomeric flexible hose for transportation of hydrocarbon liquids or gases, the method comprising:
(i) providing a hose coupling comprising a recessed portion defining a sealing area;
(ii) providing a hose comprising a semi-crystalline thermoplastic inner liner layer, and an armour layer surrounding the inner liner layer at an end of the flexible hose;
(iii) providing a semi-crystalline thermoplastic sealing material, or a cross-linked elastomeric sealing material, for introduction into the sealing area;
(iv) providing a helically wound reinforcement material wholly within the inner liner layer;
(v) providing a tie layer that is coated on an inner surface of the hose coupling to bond the hose coupling to the semi-crystalline thermoplastic sealing material within the sealing area, the semi-crystalline thermoplastic sealing material being bonded to the inner liner layer;
(vi) fitting the hose coupling to the end of the hose; and
(vii) establishing a permanent chemical bond within the sealing area between the hose end and the sealing material; and the hose coupling and the sealing material respectively.

22. The method according to claim 21, wherein the step of establishing a permanent chemical bond within the sealing area involves introducing the sealing material into the sealing area by mounting a solid meltable seal proximate the hose end before fitting the hose coupling to the hose end.

23. The method according to claim 22, wherein the step of fitting the hose coupling to the hose end is followed by the step of introducing a supporting member beneath an inner surface of said hose end, the supporting member incorporating a heater which melts the solid meltable seal within the sealing area.

24. The method according to claim 23, wherein the step of introducing the supporting member involves employing an inflatable supporting member which is temporarily inflated against the inner surface of said hose end whilst the permanent chemical bond is established.

25. The method according to claim 23, wherein the step of introducing a supporting member is followed by permanently swaging it against the inner surface of said hose end.

26. The method according to claim 23, wherein the step of melting the solid meltable seal within the sealing area is accompanied by the step of applying a vacuum to remove substantially all air from the sealing area.

* * * * *